US010281748B2

United States Patent
Sasaki et al.

(10) Patent No.: US 10,281,748 B2
(45) Date of Patent: May 7, 2019

(54) OPTICAL MODULATOR AND OPTICAL MODULE

(71) Applicant: Fujitsu Optical Components Limited, Kawasaki-shi, Kanagawa (JP)

(72) Inventors: Toyokazu Sasaki, Sapporo (JP); Yoshihiko Yoshida, Sapporo (JP); Yasuhiro Ohmori, Sapporo (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/729,220

(22) Filed: Oct. 10, 2017

(65) Prior Publication Data

US 2018/0129083 A1    May 10, 2018

(30) Foreign Application Priority Data

Nov. 9, 2016    (JP) .................................. 2016-219187

(51) Int. Cl.
| | |
|---|---|
| *G02F 1/03* | (2006.01) |
| *G02F 1/035* | (2006.01) |
| *G02F 1/225* | (2006.01) |
| *H04B 10/50* | (2013.01) |
| *G02F 1/21* | (2006.01) |

(52) U.S. Cl.
CPC ............ *G02F 1/0305* (2013.01); *G02F 1/035* (2013.01); *G02F 1/225* (2013.01); *H04B 10/5051* (2013.01); *G02F 2001/212* (2013.01); *G02F 2202/20* (2013.01)

(58) Field of Classification Search
None
See application file for complete search history.

(56) References Cited

U.S. PATENT DOCUMENTS

| | | | | |
|---|---|---|---|---|
| 5,612,086 A | * | 3/1997 | Hakogi .................. | G02B 6/122 427/163.2 |
| 5,621,839 A | * | 4/1997 | Asano .................... | G02F 1/035 385/129 |
| 7,801,400 B2 | * | 9/2010 | Sugiyama ............ | G02B 6/1342 385/32 |
| 2009/0324165 A1 | * | 12/2009 | Sugiyama ............ | G02B 6/1342 385/14 |

FOREIGN PATENT DOCUMENTS

| | | |
|---|---|---|
| JP | 4-289804 | 10/1992 |
| JP | 2015-111193 | 6/2015 |
| WO | WO 94/10592 | 5/1994 |

* cited by examiner

*Primary Examiner* — Sung H Pak
(74) *Attorney, Agent, or Firm* — Staas & Halsey LLP

(57) ABSTRACT

An optical modulator includes a substrate having an electro-optic effect; a waveguide pattern provided on the substrate and configured to modulate light; and a dummy pattern having a predetermined potential along the waveguide pattern from an input side to an output side.

10 Claims, 17 Drawing Sheets

FIG.4

| COUNTERMEASURE PATTERN TYPE | DISCHARGE OCCURRENCE RATE |
|---|---|
| NONE (FIG.7) | 10% |
| LINEAR DUMMY PATTERN (FIG.8) | 3% |
| SOLID PLANAR PATTERN (FIG.10) | 0% |

OPTICAL MODULATOR AND OPTICAL MODULE

CROSS REFERENCE TO RELATED APPLICATIONS

This application is based upon and claims the benefit of priority of the prior Japanese Patent Application No. 2016-219187, filed on Nov. 9, 2016, the entire contents of which are incorporated herein by reference.

FIELD

The embodiments discussed herein relate to an optical modulator and an optical module.

BACKGROUND

A method of manufacturing an optical modulator, e.g., an LN-waveguide modulator, includes forming a Mach-Zehnder interferometer (MZI) type waveguide pattern of titanium (Ti) on an LiNbO$_3$ (LN) wafer. Subsequently, the Ti on the wafer is thermally diffused by an ordinary manufacturing method. Since the LN wafer is a pyroelectric material, the entire wafer is electrically charged by heating the wafer.

The method of manufacturing the modulator has a problem in that the accumulated electrical charge is discharged in the waveguide pattern and results in the waveguide being formed in a damaged state. In a conventional technique, a thin-line dummy pattern is arranged along an input/output waveguide on the input/output side at the time of transfer of a Ti waveguide pattern so as to diffuse the electrical charge and suppress the waveguide damage (see, e.g., WO 1994/010592). In another conventional technique, when Ti is thermally diffused, an ionized gas is used so that electrical discharge is minimized to suppress the waveguide damage (see, e.g., Japanese Laid-Open Patent Publication No. H04-289804). In another disclosed technique, a solid planar pattern is arranged inside an MZI to suppress electrical discharge (see, e.g., Japanese Laid-Open Patent Publication No. 2015-111193).

SUMMARY

According to an aspect of an embodiment, an optical modulator includes a substrate having an electro-optic effect; a waveguide pattern provided on the substrate and configured to modulate light; and a dummy pattern having a predetermined potential along the waveguide pattern from an input side to an output side.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a comparison chart of occurrence rates of electrical discharge according to the embodiments and a conventional configuration;

DESCRIPTION OF THE INVENTION

In recent optical communications systems, a Dual Polarization-Quadrature Phase Shift Keying (DP-QPSK) system is mainly used. Although a conventional LN modulator has a single MZI arranged per chip, the DP-QPSK modulator has multiple MZIs arranged per chip and, as waveguide configurations become more complicated, the chip size increases. For example, in the case of the DP-QPSK modulator, a total of six MZIs are arranged per chip. The electrical charge due to the pyroelectricity of the LN wafer accumulates in the entire wafer when the wafer is heated to a high temperature.

Figure 17:
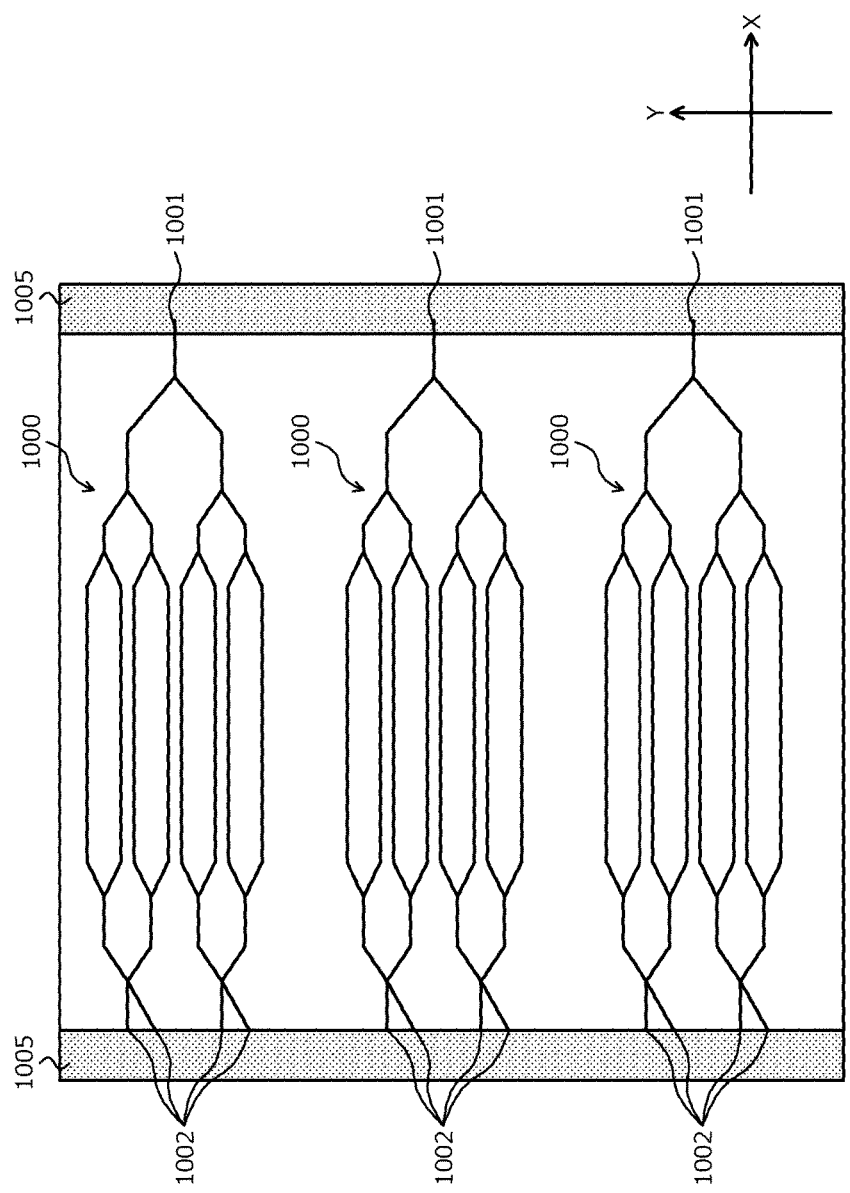
FIG. 17 is a diagram of a waveguide pattern of an existing DP-QPSK modulator.

FIG. 17 is a diagram of a waveguide pattern of an existing DP-QPSK modulator. For one waveguide pattern 1000, an input waveguide 1001 has one port, while an output waveguide 1002 has four ports because a signal port and a monitor optical port are included for each of X and Y polarizations. As depicted in FIG. 17, the input waveguide 1001 and the output waveguide 1002 are connected to a chip connecting pattern (ground pattern) 1005 and, at the time of thermal diffusion of the waveguide pattern formed of Ti, damage of the pattern may be prevented when the electrical charge flows through the Ti pattern to the chip connecting pattern 1005 on the input/output side.

However, in the waveguide pattern 1000 of FIG. 17, the density of the Ti pattern is lower on the input side as compared to the output side. Furthermore, the chip size increases due to the complexity of the modulator configuration. As a result, the DP-QPSK modulator has a lower density of the Ti pattern for the waveguide 1001 on the input side than that of single-MZI modulators whereby the electrical charge due to the pyroelectricity cannot be released sufficiently, resulting in damage of the pattern of the waveguide 1001 on the input side.

In a chip with multiple MZIs integrated as in the DP-QPSK modulator etc., a larger chip size due to the complexity of the configuration leads to an increase in the space without the Ti pattern and thus, the electrical discharge cannot be prevented by the conventional techniques.

Figure 1:
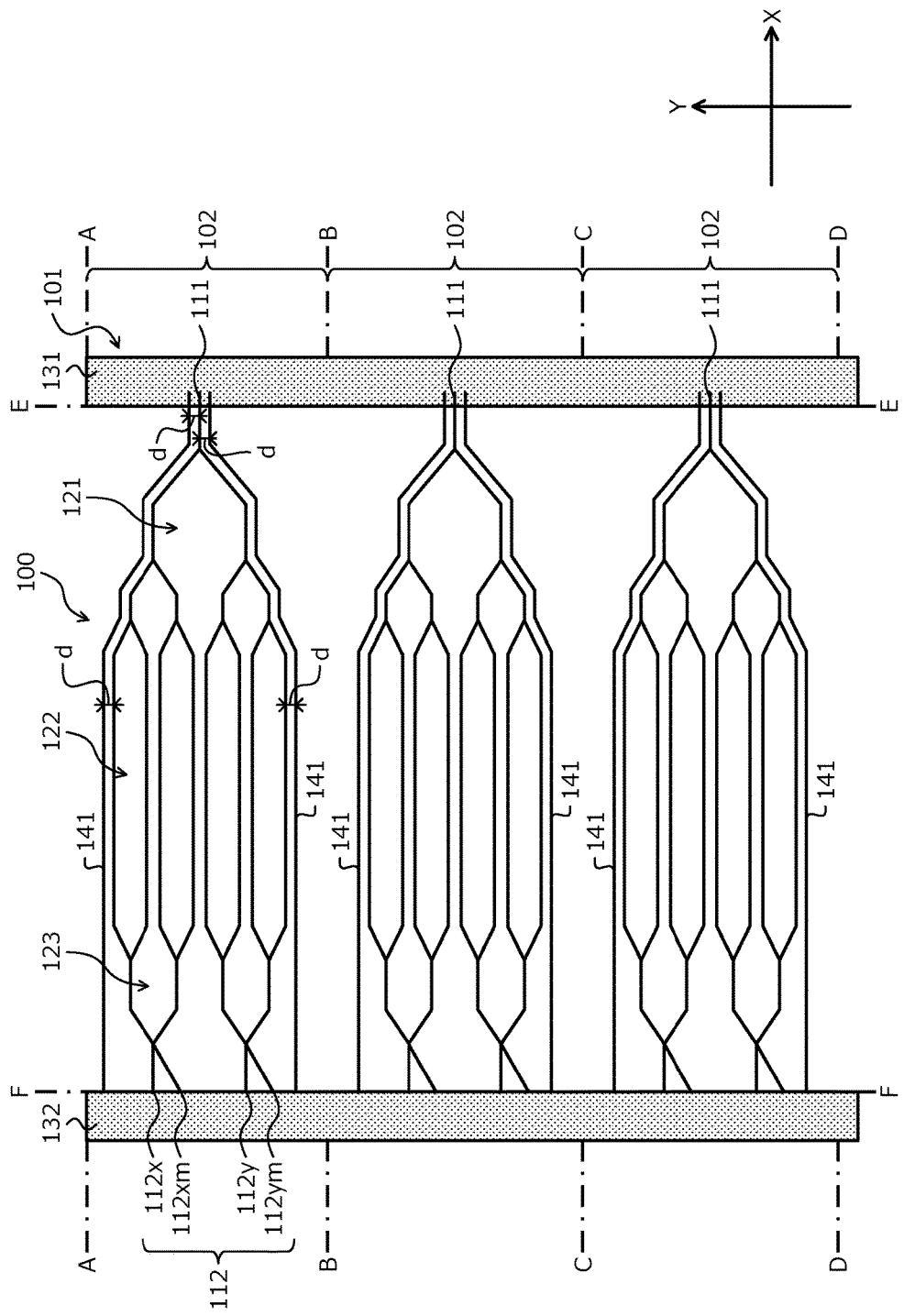
FIG. 1 is a plan view of a configuration example of a first embodiment of an optical modulator.

FIG. 1 is a plan view of a configuration example of a first embodiment of an optical modulator. In the following embodiments, an example of application to an optical modulator of a DP-QPSK system will be described. An optical modulator 100 has multiple waveguide patterns 102 on a substrate (LN wafer) 101 of lithium niobate (LN: LiNbO$_3$) having an electro-optic effect. One waveguide pattern 102 corresponds to one chip and a multiple waveguide patterns are included therein. In FIG. 1, only the configuration related to the waveguide patterns 102 of the optical modulator 100 is depicted, and signal electrodes, etc. are not depicted.

The DP-QPSK system is made up of plural MZIs, and in each of the waveguide patterns 102, an input waveguide 111 has one port while an output waveguide 112 has four ports. The input waveguide 111 is branched into X polarization and Y polarization branches by a brancher 121. The branches pass through a signal electrode (not depicted) and an interaction part 122 having a predetermined length along a length direction X on each of the X-polarization and Y-polarization sides and are coupled by a coupler 123. Eight waveguide patterns 102 are formed along a width direction Y in the interaction part 122 for each of the waveguide patterns 102.

The output waveguide 112 portion has signal ports 112$x$ and 112$y$ as well as monitor optical ports 112$xm$ and 112$ym$ for the X polarization and Y polarization, respectively, and therefore, has four ports.

For the waveguide patterns 102, multiple patterns corresponding to multiple MZIs are formed by using Ti, etc. Subsequently, for example, the waveguide patterns 102 are thermally diffused, forming thermally-diffused optical waveguides on the substrate 101. The waveguide patterns 102 are thermally diffused to form the optical waveguides and each is denoted by a common reference numeral 102.

Here, formation of the waveguide patterns 102 is described. As depicted in FIG. 1, by a technique such as photolithography using a photomask, etc., the multiple waveguide patterns 102 are transferred onto the LN wafer 101 on which Ti, etc. has been vapor-deposited. Subsequently, unnecessary Ti other than the waveguide patterns 102 is removed by wet etching, etc.

When the waveguide patterns 102 are formed, a chip connecting pattern 131 is formed on the input waveguide 111 side of the multiple waveguide patterns 102 along the width direction Y orthogonal to the length direction X so as to connect the end portions of the input waveguides 111. Similarly, a chip connecting pattern 132 is formed on the output waveguide 112 side of the multiple waveguide patterns 102 along the width direction Y so as to connect the end portions of the output waveguides 112 (112$x$, 112$xm$, 112$y$, 112$ym$). The chip connecting patterns 131, 132 are ground patterns connecting multiple chips (the waveguide patterns 102) and have a predetermined potential, for example, a ground potential.

In the first embodiment, as a measure against waveguide damage, linear dummy patterns 141 are formed on a photomask, etc. on the outside of the waveguide patterns 102 located in outermost portions so as to surround the waveguide patterns 102. The waveguide patterns 102 and the dummy patterns 141 are simultaneously transferred to the wafer 101 by using the photomask on which the waveguide patterns 102 and the dummy patterns 141 are formed.

As depicted in FIG. 1, the dummy pattern 141 is formed along each side of each input waveguide 111 in the width direction Y and is connected to the input-side chip connecting pattern 131. The dummy pattern 141 is formed along the outside of the outermost portions of the four output waveguides 112 in the width direction Y for each of the waveguide patterns 102 and is connected to the output-side chip connecting pattern 132. The dummy patterns 141 connect the input-side chip connecting pattern 131 and the output-side chip connecting pattern 132 via the outermost portions of the waveguide patterns 102.

In the example of FIG. 1, a pair of the dummy patterns 141 is formed to have a width therebetween gradually becoming wider along the outermost portions of the waveguide pattern 102 from the input-side chip connecting pattern 131 portion through the input waveguide 111 to the brancher 121. Subsequently, the pair of the dummy patterns 141 is positioned to maintain a width in the direction Y along the waveguide pattern 102 (in a linear shape having the widest distance of the waveguide pattern 102) and is connected to the output-side chip connecting pattern 132.

Both the waveguide pattern 102 and the dummy pattern 141 have a function of an optical waveguide after thermal diffusion and therefore, may be optically coupled to light guided though the waveguide pattern 102 of the optical modulator 100. Therefore, the dummy pattern 141 may be separated from the waveguide pattern 102 by 50 μm or more (e.g., 100 μm or more) (distanced in FIG. 1).

By using such patterns on a photomask, etc., Ti is patterned on the LN wafer 101 to form, at the same time, the waveguide patterns 102 and the dummy patterns 141 as an anti-discharge measure. Subsequently, when the optical waveguides 102 are formed by thermal diffusion, the dummy patterns 141 diffuse electrical charge resulting from a pyroelectric effect of the LN wafer 101. As a result, the occurrence of electrical discharge is suppressed in the waveguide patterns 102 whereby the waveguide patterns 102 may be formed on the LN wafer 101 without damage.

As depicted in FIG. 1, in the waveguide patterns 102, the input waveguides 111 have a lower density of Ti patterns as compared to the output waveguide 112. The linear dummy patterns 141 are connected to the chip connecting patterns 131, 132 on the input side and the output side. This makes the density of patterns higher in the input waveguide 111 portion. Additionally, the dummy patterns 141 may release the electrical charge also to the output-side chip connecting pattern 132.

Therefore, the dummy patterns 141 have a large charge diffusing effect in the input waveguide 111 portion and can prevent the input waveguide 111 portion from being damaged due to electrical discharge. It is noted that the dummy patterns 141 may suppress the occurrence of electrical discharge not only in the input waveguide 111 portion but also in the entire waveguide pattern 102 along the length direction X from the input waveguide 111 to the output waveguide 112 so as to prevent the overall waveguide pattern 102 from being damaged.

After thermally diffusing the waveguide patterns, a signal electrode and a ground electrode are formed on the LN wafer and subsequently, as indicated by dividing lines A to D of FIG. 1, chips are formed on the basis of the respective waveguide patterns 102 by dividing (cutting) each of the waveguide patterns 102 by dicing, etc. When this is performed, the portions of the chip connecting patterns 131, 132 on the input side and the output side are also divided at portions corresponding to dividing lines E, F so as to form chips each having the one input waveguide 111 and the four output waveguides 112 for each of the waveguide patterns 102.

As described above, according to the first embodiment, since the dummy patterns are provided, when the optical waveguide is formed by thermally diffusing the waveguide patterns, the occurrence of electrical discharge in the waveguide patterns may be suppressed to prevent damage of the waveguide patterns. Additionally, the dummy patterns may be formed as patterns at the same time as the waveguide pattern and may be created easily.

Figure 2:
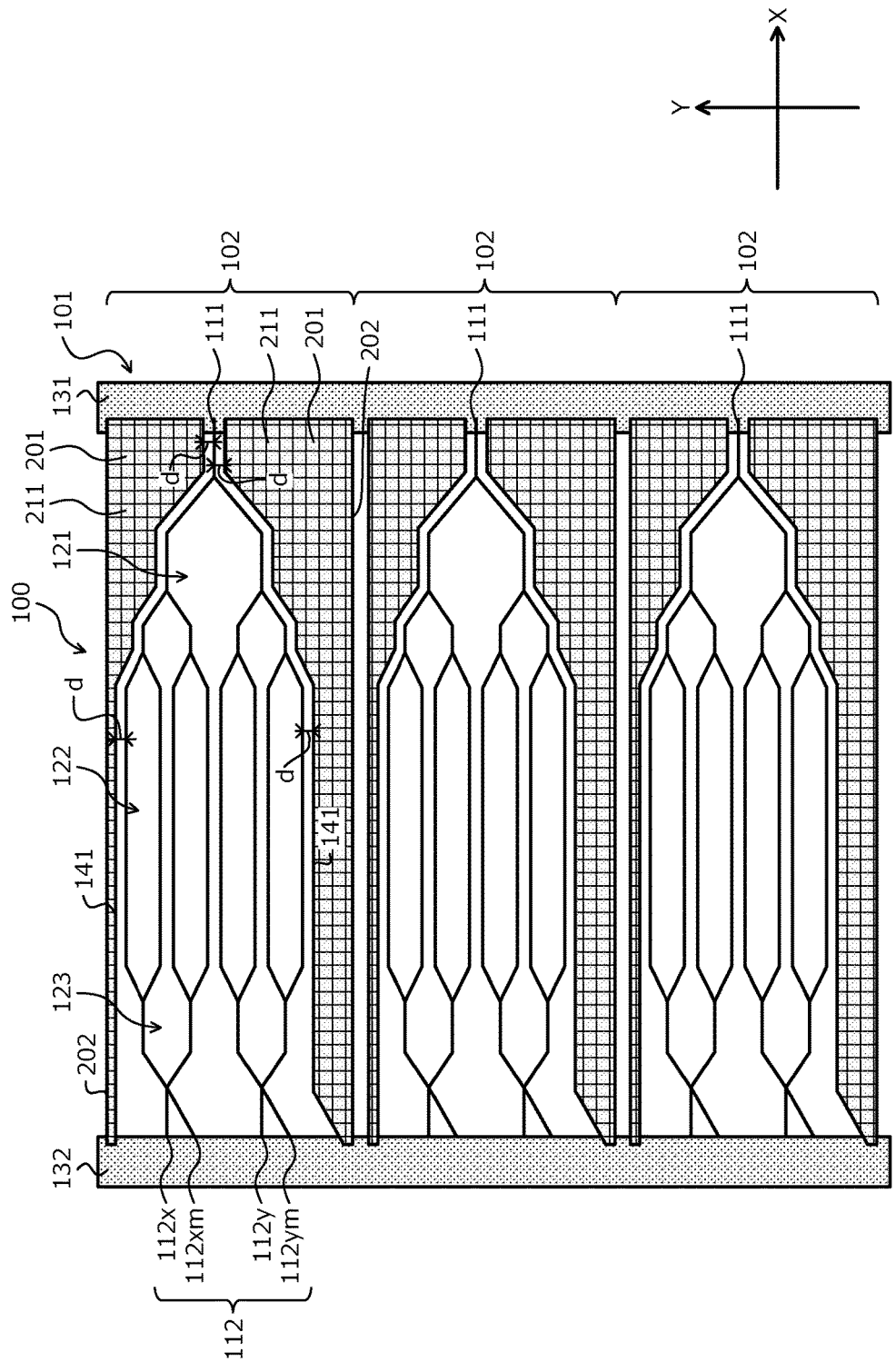
FIG. 2 is a plan view of a configuration example of a second embodiment of the optical modulator.

FIG. 2 is a plan view of a configuration example of a second embodiment of the optical modulator. In FIG. 2, the same constituent parts as FIG. 1 are denoted by the same reference numerals used in FIG. 1. In the second embodiment, similar to the first embodiment, dummy patterns 201 having a predetermined area are provided in a mesh shape at positions outside the outermost portions of the waveguide pattern 102. Both the waveguide patterns 102 and the dummy pattern 201 are formed by patterning Ti.

For example, similar to the first embodiment, the dummy patterns 201 are provided to surround the outermost portions of the waveguide patterns 102 while the linear dummy patterns 141 to connect the input-side chip connecting pattern 131 and the output-side chip connecting pattern 132. Additionally, linear dummy patterns 202 are provided at positions outside a pair of the dummy patterns 141 (as viewed from the waveguide pattern 102), so as to connect the input-side chip connecting pattern 131 and the output-side chip connecting pattern 132 through a straight line. A mesh pattern is formed in a region between the dummy patterns 141 and 202. The shape of the mesh may be made up of multiple lines intersecting each other, and may be any of various mesh shapes such as shapes formed by lines orthogonal to each other or intersecting at a predetermined angle.

The dummy pattern 201 has a mesh region 211 of a predetermined area on the input waveguide 111 side.

Regarding the dummy pattern 201, a pattern is arranged in a mesh shape particularly in a vacant space on the input waveguide 111 side having a lower density of Ti patterns on a photo mask, etc. for transferring the waveguide patterns 102 to the LN wafer 101. The mesh dummy pattern 201 is connected to the solid planar pattern (ground pattern) 131 connecting the chips on the input side at a large number of positions in the width direction Y, and is connected to the output-side chip connecting pattern 132 along the waveguide pattern 102.

The dummy pattern 201 has a function of an optical waveguide after thermal diffusion similar to the first embodiment and therefore, may be optically coupled to light guided though the waveguide pattern 102 of the optical modulator 100. Therefore, the mesh dummy pattern 201 (the closest linear dummy patterns 141) and the waveguide pattern 102 may be separated from each other by about 50 μm (distance d in FIG. 2).

In the second embodiment, after thermal diffusion of the waveguide patterns 102, a signal electrode and a ground electrode are formed on the LN wafer and, subsequently, chips are formed on the basis of the waveguide patterns 102 by dicing along the dividing lines similar to FIG. 1.

According to the second embodiment described above, the pattern density on the input waveguide side is higher as compared to the linear dummy patterns of the first embodiment, and the effect of diffusing the electrical charge may be increased, so that the effect of preventing the electrical discharge may be enhanced as compared to the linear dummy patterns.

Figure 3:
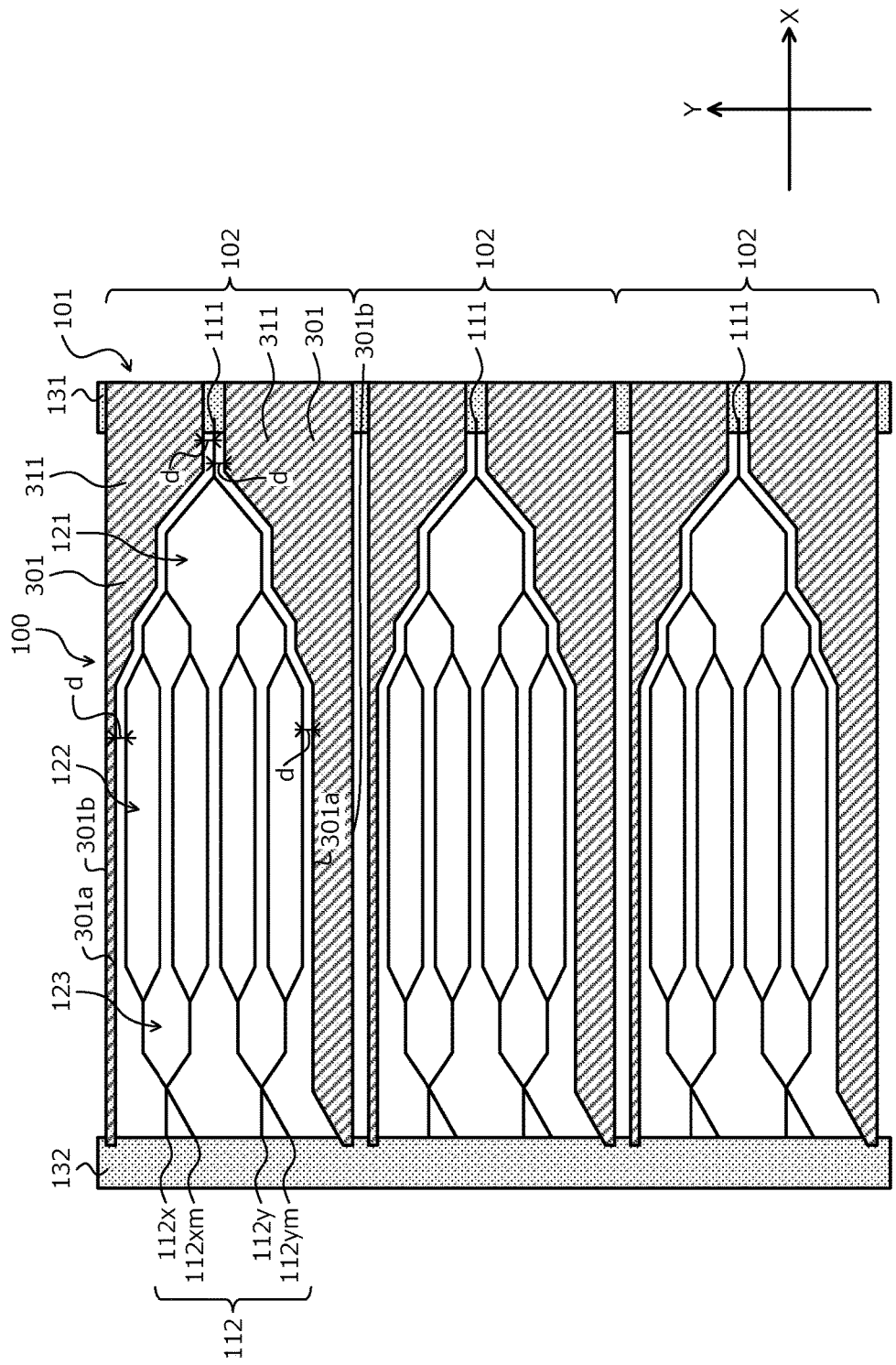
FIG. 3 is a plan view of a configuration example of a third embodiment of the optical modulator.

FIG. 3 is a plan view of a configuration example of a third embodiment of the optical modulator. In FIG. 3, the same constituent parts depicted in FIG. 1 are denoted by the same reference numerals used in FIG. 1. In the second embodiment, the dummy patterns 201 are formed into mesh as described above; however, in the third embodiment, solid planar dummy patterns 301 having a predetermined area are formed outside the waveguide pattern 102. Both the waveguide pattern 102 and the solid planar dummy patterns 301 are formed by patterning Ti.

For example, an inner edge portion 301a of the solid planar dummy pattern 301 is provided at a position separated by the distance d from the outermost portion of the waveguide pattern 102. An outer edge portion 301b of the solid planar dummy pattern 301 connects the input-side chip connecting pattern 131 and the output-side chip connecting pattern 132 through a straight line. A solid surface pattern of Ti is formed in the entire region between the inner edge portion 301a and the outer edge portion 301b.

The dummy pattern 301 has a solid region 311 of a predetermined area on the input waveguide 111 side.

A manufacturing method according to the third embodiment may be achieved in a similar way as the first embodiment. The solid planar dummy pattern 301 is formed on a photomask, etc. transferring the chip patterns (the waveguide patterns 102) to the LN wafer 10. The solid planar dummy pattern 301 has the inner edge portion 301a provided closely at the distance d on both sides in the width direction Y so as to ensure that the area of a solid planar region near the input waveguide 111 is large. The solid planar dummy pattern 301 is connected to the input-side chip connecting pattern 131, extends toward the output side along the outermost portion of the waveguide pattern 102 maintaining the distance d, and is connected to the output-side chip connecting pattern 132.

The solid planar dummy pattern 301 has a function of an optical waveguide after thermal diffusion similar to the first embodiment and therefore, may be optically coupled to light guided though the waveguide pattern 102 of the optical modulator 100. Therefore, this optical coupling may be prevented by separating the solid planar dummy pattern 301 (the closest inner edge portion 301a) and the waveguide pattern 102 from each other by the distanced (about 50 μm).

In the third embodiment, after thermally diffusing the waveguide patterns 102, a signal electrode and a ground electrode are formed on the LN wafer and subsequently, chips are formed on the basis of the respective waveguide patterns 102 by dicing along the dividing lines similar to FIG. 1.

According to the third embodiment, the solid planar dummy pattern 301 of Ti is provided to fill a space on the input waveguide 111 side where the damage of the waveguide patterns 102 tends to occur due to electrical discharge. As a result, the electrical charge due to the pyroelectric effect may be diffused more strongly as compared to the first and second embodiments and the occurrence of the electrical discharge may be suppressed whereby the waveguide patterns 102 may be formed without damage on the LN wafer 101.

FIG. 4 is a comparison chart of occurrence rates of electrical discharge according to the embodiments and a conventional configuration. The chart describes the occurrence rates of electrical discharge at the time of thermal diffusion of Ti in configurations of the waveguide patterns 102 having the dummy patterns 141, 301 described in the first and third embodiments and the conventional waveguide pattern having no dummy pattern.

For example, these occurrence rates of electrical discharge were acquired by testing examples of application to a Dual Carrier DP-QPSK modulator (see FIGS. 7, 8, and 10) described later. The conventional waveguide pattern and the waveguide patterns used in the embodiments had the same shape.

The occurrence rate of electrical discharge depicted in FIG. 4 was 10% in the conventional waveguide pattern (see FIG. 7) having no dummy pattern as an anti-discharge measure. The rate was 3% in the linear dummy pattern 141 described in the first embodiment (see FIGS. 1 and 8) and 0% in the solid planar dummy pattern 301 described in the third embodiment (see FIGS. 3 and 10). The occurrence rate of electrical discharge corresponds to the occurrence rate of waveguide damage.

As depicted in FIG. 4, the conventional waveguide pattern having no dummy pattern as an anti-discharge measure has the highest occurrence rate of electrical discharge, and the occurrence rate of electrical discharge becomes lower in the order of the linear dummy pattern 141 and the solid planar dummy pattern 301. This means that when the dummy patterns 141, 302 formed of Ti similar to the waveguide patterns 102 have larger areas, the electrical charges accumulated due to pyroelectricity are more diffused and released to the ground for chip connection (the chip connecting patterns 131, 132) so as to suppress the electrical discharge.

Therefore, it is found that the density is made higher and the effect of diffusing the electrical charges is made stronger when the dummy pattern is the solid planar dummy pattern (FIG. 3) of the third embodiment as compared to the linear shape (FIG. 1) of the first embodiment and the mesh (FIG. 2) of the second embodiment.

Figure 5:
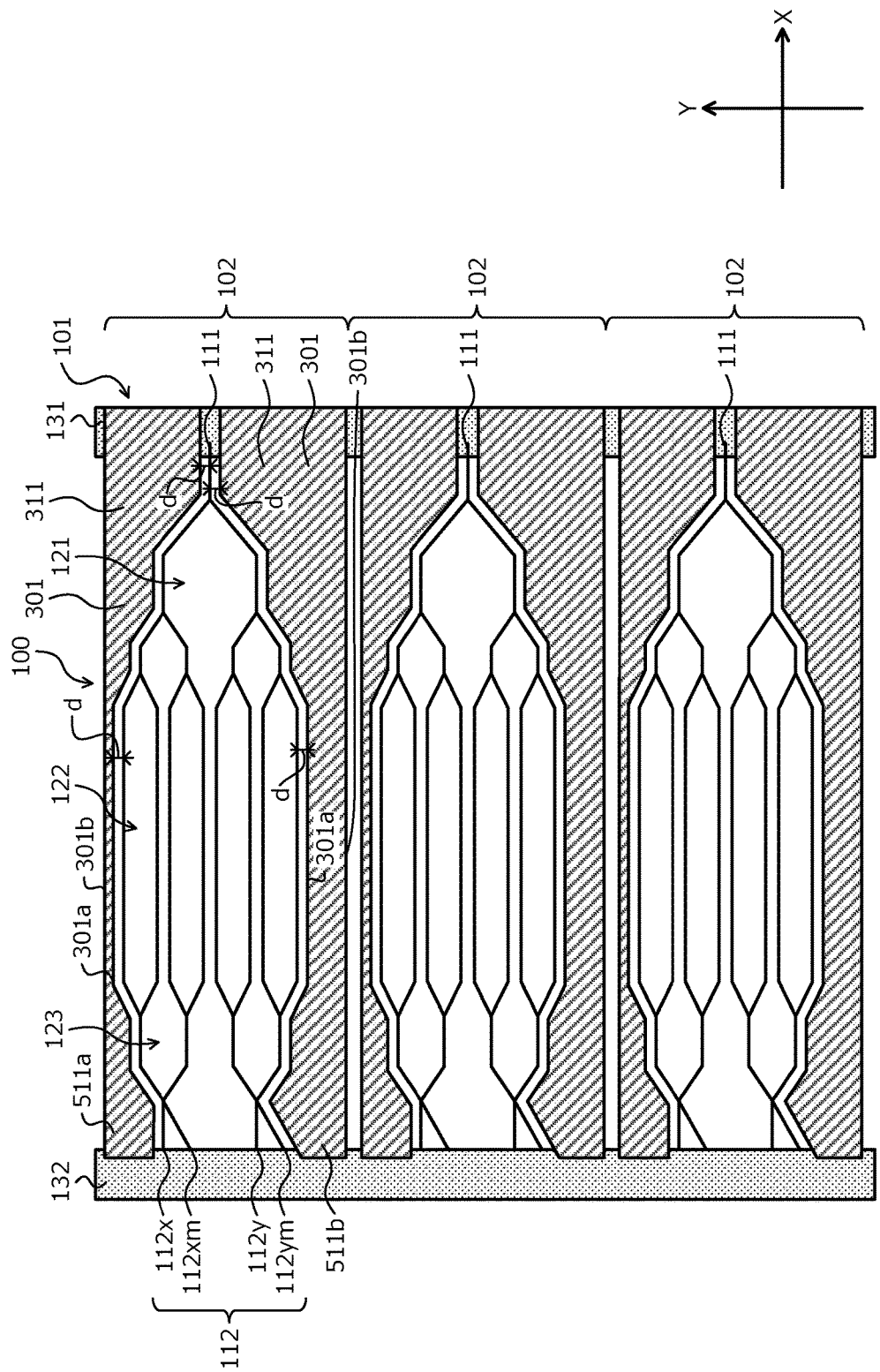
FIG. 5 is a plan view of a configuration example of a fourth embodiment of the optical modulator.

FIG. 5 is a plan view of a configuration example of a fourth embodiment of the optical modulator. The fourth embodiment is a modification example of the third embodiment (FIG. 3). With regard to the technique of transferring the waveguide pattern 102, the dummy pattern 301 is patterned and formed together with the waveguide pattern 102 by using Ti similar to the embodiments described above.

The fourth embodiment has a large solid planar pattern (the solid region 311) along the input waveguide 111 side similar to the solid planar dummy pattern 301 described in the third embodiment. Furthermore, in the fourth embodiment, a solid planar pattern (solid region 511) is provided also on the output waveguide 112 side in a space where the waveguide pattern 102 is not formed.

For example, as depicted in FIG. 5, the four ports (output waveguide) 112 are provided on the output side of the optical modulator 100 of DP-QPSK. Therefore, a first solid region 511a is provided such that the inner edge portion 301a of the solid planar dummy pattern 301 is located at the distance d along the output waveguide 112x for X polarization located in the outermost portion around the waveguide pattern 102. Similarly, a second solid region 511b is provided such that the inner edge portion 301a of the solid planar dummy pattern 301 is located at the distance d along the monitor optical port 112ym for Y polarization located in the outermost portion around the waveguide pattern 102.

Although the output waveguide 112 side depicted in FIG. 5 has a higher ability to diffuse the electrical charge as compared to the input waveguide 111 side, the ability to diffuse the electrical charge may be further enhanced by providing the solid planar dummy pattern 511 closer to the output waveguide 112 portion.

Figure 6:
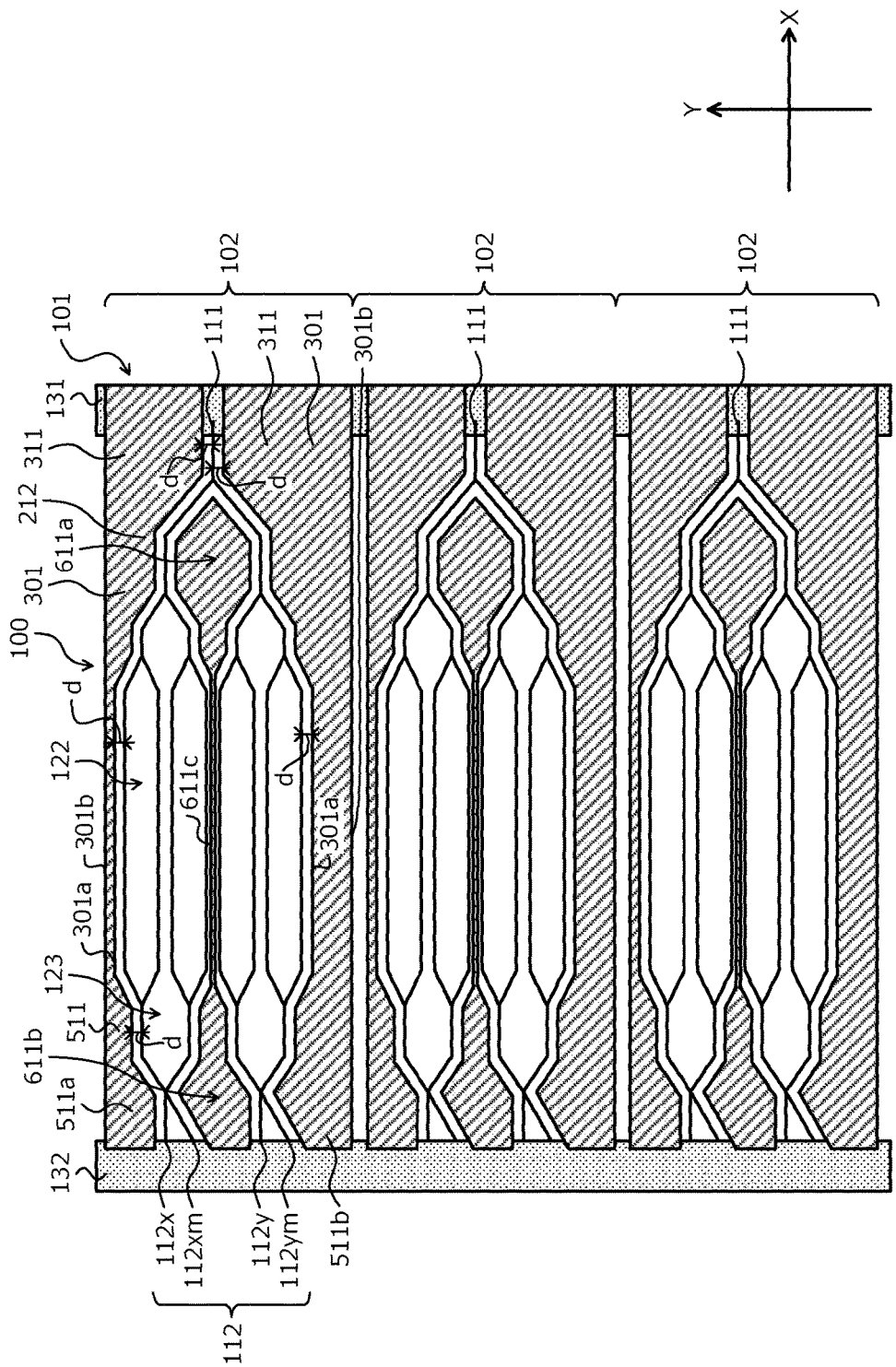
FIG. 6 is a plan view of a configuration example of a fifth embodiment of the optical modulator.

FIG. 6 is a plan view of a configuration example of a fifth embodiment of the optical modulator. The fifth embodiment is a modification example of the fourth embodiment (FIG. 5). With regard to the technique of transferring the waveguide pattern 102, the dummy pattern 301 is patterned and formed together with the waveguide pattern 102 by using Ti similar to the embodiments described above.

In the fifth embodiment, the large solid region 311 is formed along the input waveguide 111 side for the solid planar dummy pattern 301 similar to the fourth embodiment. The large solid region 511 (511a, 511b) is provided also on the output waveguide 112 side in a space where the waveguide pattern 102 is not formed.

Furthermore, in the fifth embodiment, a solid region 611 is provided between the waveguide patterns 102 of the X and Y polarizations. For example, as depicted in FIG. 6, a solid region 611a is provided in a space of a central portion of the branching unit 121 at the distance d from the waveguide pattern 102. Similarly, a solid region 611b is provided in a space of a central portion of the coupler 123 at the distance d from the waveguide pattern 102. The solid region 611a is connected to the solid region 611b via a connecting pattern 611c. The solid region 611b is connected to the chip connecting pattern 132 on the output waveguide 112 side and the solid region 611a of the brancher 121 is connected to the ground chip connecting pattern 132.

In this way, the solid regions 311, 611a are respectively provided on the outside and inside of the branching position (the brancher 121) of the X and Y polarizations of the waveguide pattern 102. The solid regions 511 (511a, 511b), 611b are respectively provided on the outside and inside of the coupling position (the coupler 123) of the X and Y polarizations of the waveguide pattern 102. As a result, in particular, the electrical charge may be diffused on both sides of the brancher 121 near the input waveguide 111 whereby the electrical discharge may more strongly be prevented than in the fourth embodiment.

Leakage light radiated from the brancher 121 portion of the waveguide pattern 102, unnecessary light passing through a bulk portion of the LN wafer 101 under the waveguide pattern 102, etc. may be optically coupled to the solid planar dummy patterns (the solid regions 611a, 611b) and may affect optical properties. Therefore, unnecessary light may be suitably shielded by limiting the sizes of the solid regions 611a, 611b, for example.

Description will be made of embodiments when the configurations of the first to fifth embodiments described above are applied to a Dual Carrier (DC) DP-QPSK modulator.

Figure 7:
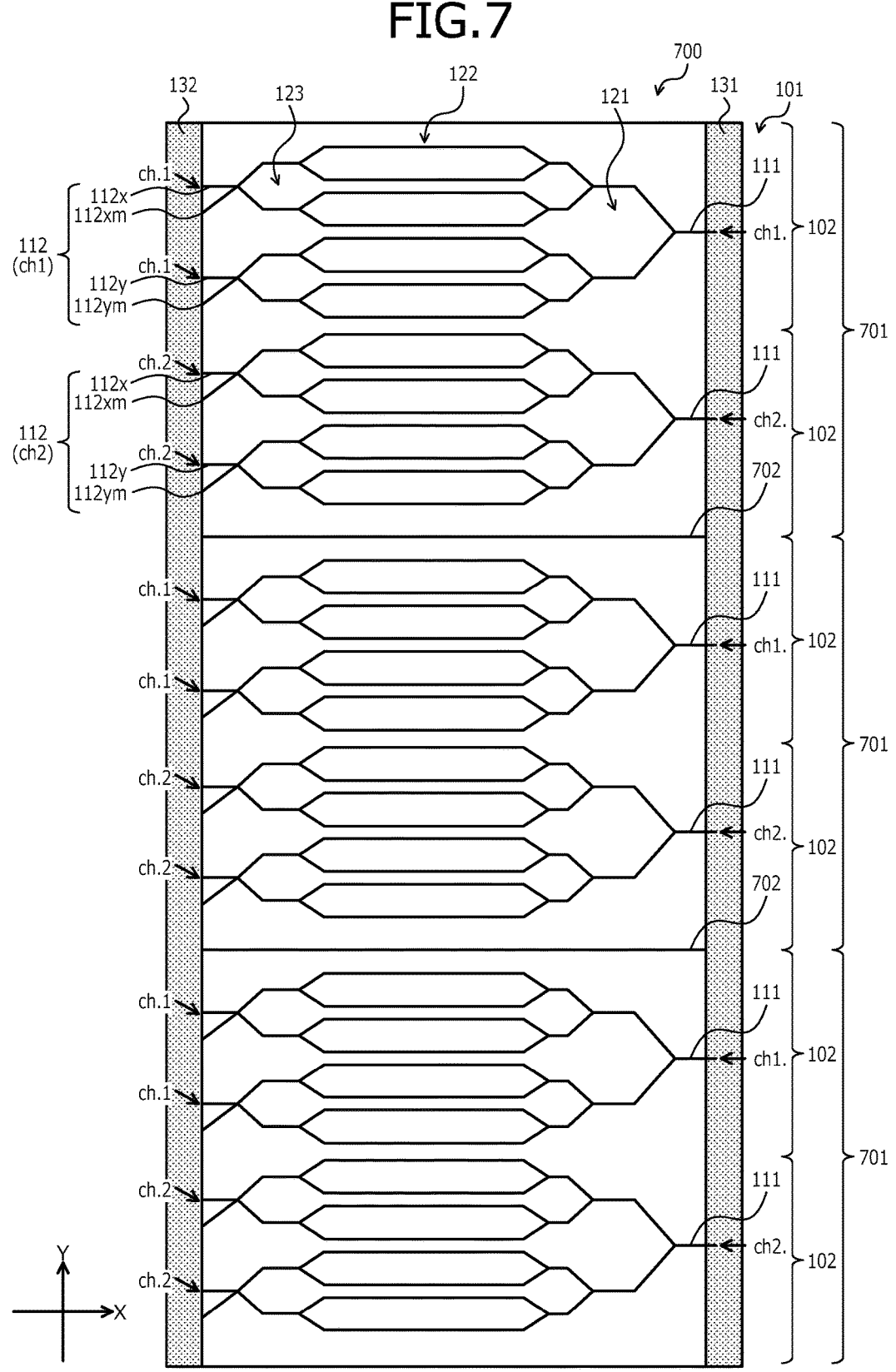
FIG. 7 is a diagram of a waveguide pattern of an existing DC DP-QPSK modulator.

FIG. 7 is a diagram of a waveguide pattern of an existing DC DP-QPSK modulator. FIG. 7 depicts a configuration without the dummy patterns of the first to fifth embodiments described above. In this example, the two waveguide patterns 102 of a (two-channel: 2ch) DP-QPSK modulator 700 are included on each of chips 701 after division by dicing, and the three chips 701 are provided on the LN wafer 101. Reference numeral 702 denotes a dicing pattern for dividing the chips 701 provided according to patterns of Ti.

Figure 8:
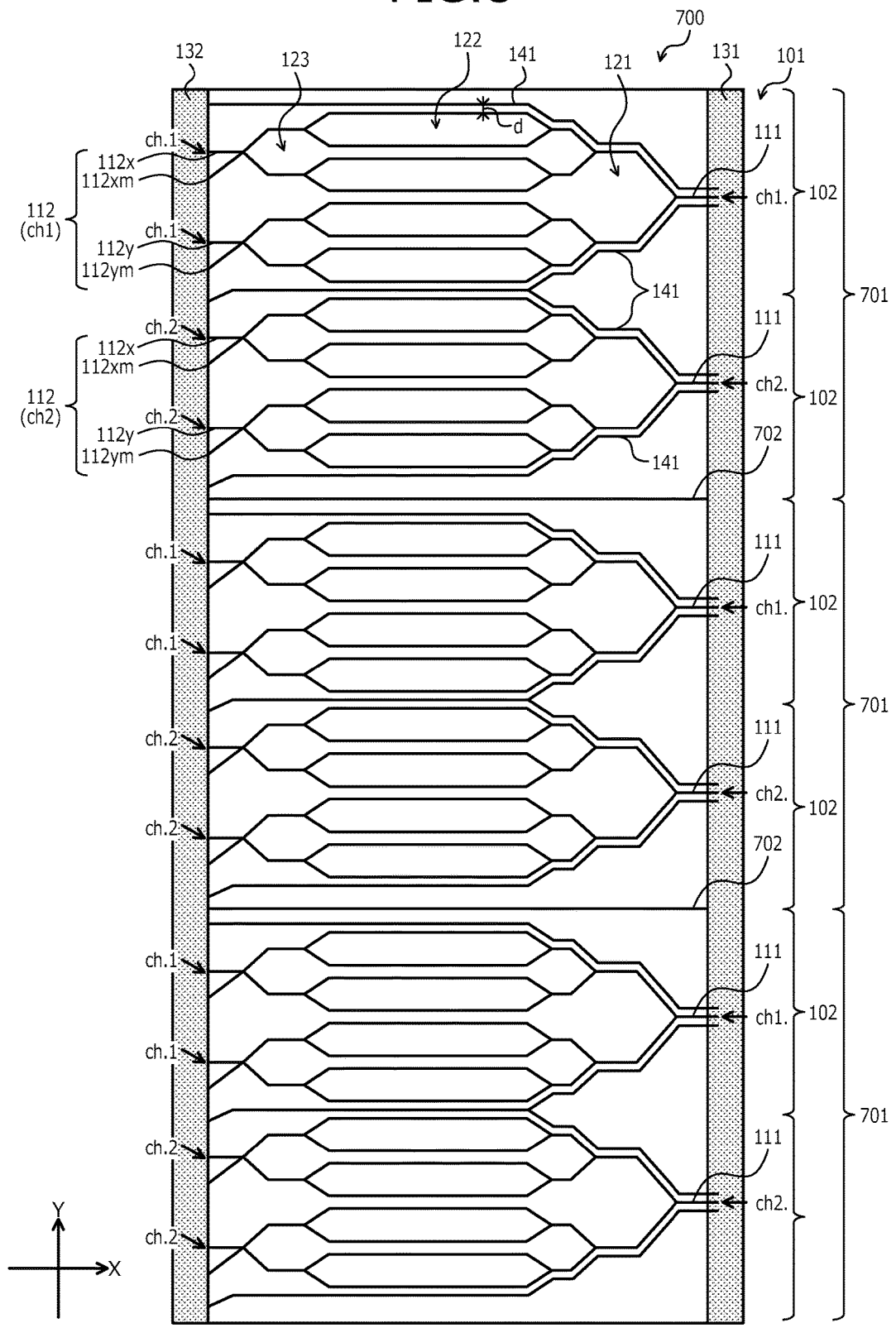
FIG. 8 is a plan view of a configuration example of a DC DP-QPSK optical modulator according to a sixth embodiment.

FIG. 8 is a plan view of a configuration example of a DC DP-QPSK optical modulator according to a sixth embodiment. Parts similar to those described in the first to fifth embodiments are denoted by the same reference numerals used in the first to fifth embodiments. The DC DP-QPSK modulator 700 corresponds to a configuration in which the two DP-QPSK optical modulators 100 are arranged in parallel on a single chip. Therefore, the chip size becomes larger than that of the standard DP-QPSK optical modulator 100, and the density of the input-side Ti patterns (the input waveguides 111) is further reduced.

In the sixth embodiment, the linear dummy patterns 141 are arranged to surround the outermost portions of the waveguide patterns 102 corresponding to the DP-QPSK optical modulators 100 for each chip. Therefore, the configuration of the sixth embodiment has the waveguide patterns 102 depicted in FIG. 7, and the linear dummy patterns 141 described in the first embodiment (FIG. 1) are provided.

The linear dummy patterns 141 extend from the ground pattern of chip connection on the input side (the chip connecting pattern 131), along the waveguide patterns 102 and maintain the distance d similar to the first embodiment. The linear dummy patterns are provided to be connected to the ground pattern of chip connection on the output side (the chip connecting pattern 132).

According to the sixth embodiment, the linear dummy patterns 141 connecting the chip connecting patterns 131, 132 on the input side and the output side are also provided along the waveguide pattern 102 in the configuration of the DC DP-QPSK optical modulator for each channel of the DP-QPSK modulators. As a result, the occurrence of electrical discharge may be prevented in the waveguide pattern 102 portion of the DP-QPSK modulator of each channel and in particular, the input waveguide 111 portion may be prevented from being damaged due to the occurrence of electrical discharge.

Figure 9:
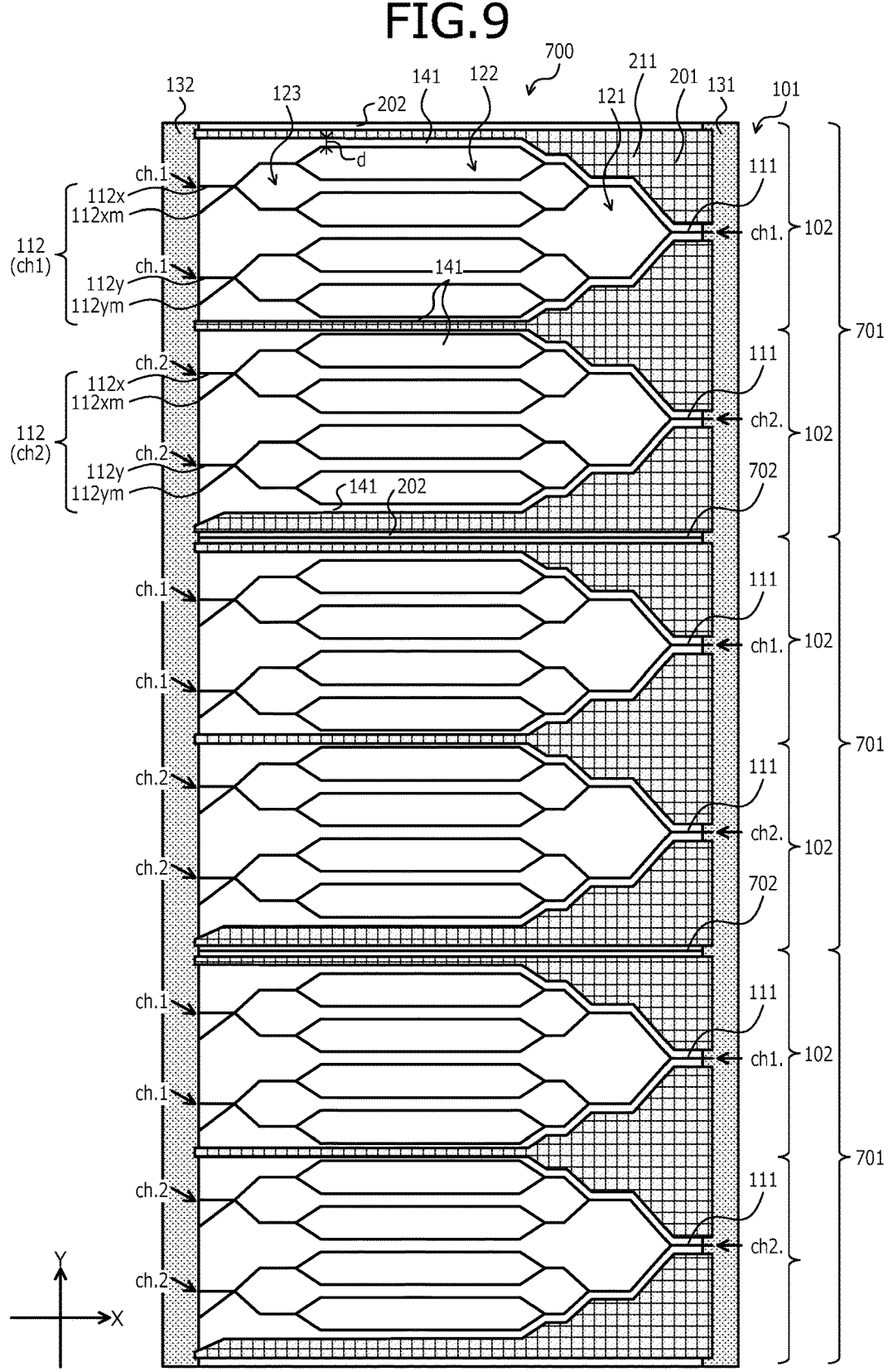
FIG. 9 is a plan view of a configuration example of a DC DP-QPSK optical modulator according to a seventh embodiment.

FIG. 9 is a plan view of a configuration example of a DC DP-QPSK optical modulator according to a seventh embodiment. Parts similar to those described in the first to sixth embodiments are denoted by the same reference numerals used in the first to sixth embodiments. The configuration of the seventh embodiment has the waveguide patterns 102 depicted in FIG. 7, and the mesh dummy patterns 201 described in the second embodiment (FIG. 2) are provided.

The mesh dummy patterns 201 are provided with the linear dummy patterns 141 extending from the ground pattern of chip connection on the input side (the chip connecting pattern 131), along the waveguide patterns 102 and maintaining the distance d similar to the second embodiment. Additionally, the linear dummy patterns 202 are provided at positions outside a pair of the dummy patterns 141 as viewed from the waveguide pattern 102, so as to connect the input-side chip connecting pattern 131 and the output-side chip connecting pattern 132 through a straight line. Mesh patterns are formed in regions between the dummy patterns 141 and 202. The mesh dummy patterns 201 have a predetermined area of the mesh regions 211 on the input waveguide 111 side.

According to the seventh embodiment, the mesh dummy patterns 201 connecting the chip connecting patterns 131, 132 on the input side and the output side are also provided along the waveguide pattern 102 in the configuration of the DC DP-QPSK optical modulator for each channel of the DP-QPSK modulators. As a result, the occurrence of electrical discharge may be prevented in the waveguide pattern 102 portion of the DP-QPSK modulator of each channel and in particular, the input waveguide 111 portion may be prevented from being damaged due to the occurrence of electrical discharge. The mesh dummy patterns 201 have a higher pattern density on the input waveguide side as compared to the linear dummy patterns 141, may increase the effect of diffusing electrical charge, and may enhance the effect of preventing the electrical discharge as compared to the linear dummy patterns 141 of the sixth embodiment.

Figure 10:
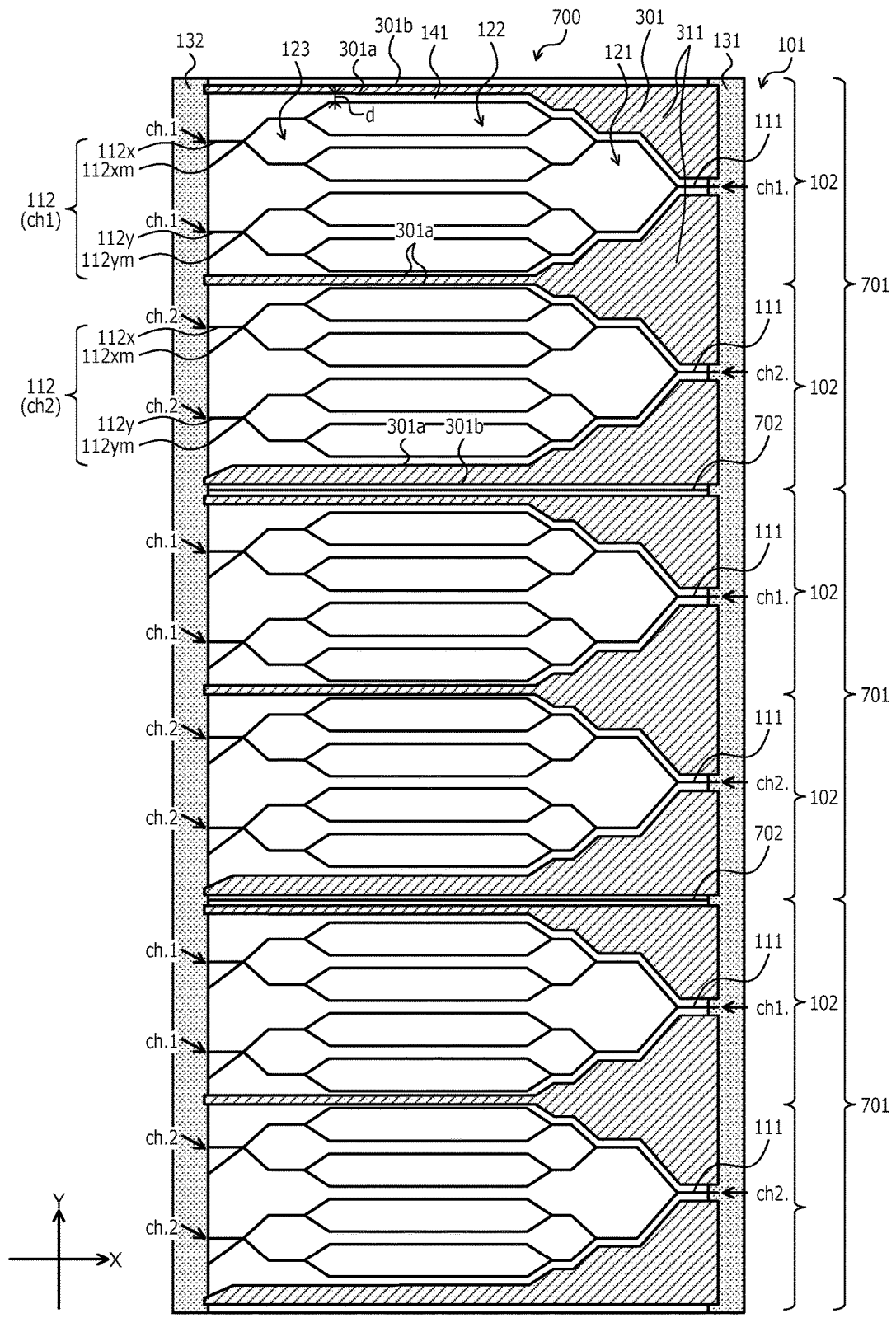
FIG. 10 is a plan view of a configuration example of a DC DP-QPSK optical modulator according to an eighth embodiment.

FIG. 10 is a plan view of a configuration example of a DC DP-QPSK optical modulator according to an eighth embodiment. Parts similar to those described in the first to seventh embodiments are denoted by the same reference numerals used in the first to seventh embodiments. The configuration of the eighth embodiment has the waveguide patterns 102 depicted in FIG. 7 and the solid planar dummy patterns 301 described in the third embodiment (FIG. 3) are provided.

The eighth embodiment differs in that the mesh dummy patterns 201 of the seventh embodiment are changed to the solid planar dummy patterns 301. The solid planar dummy patterns 301 are provided with the inner edge portions 301a extending from the ground pattern of chip connection on the input side (the chip connecting pattern 131) along the waveguide patterns 102 at the distance d similar to the third embodiment. Additionally, the outer edge portions 301b are provided at positions outside a pair of the dummy patterns 141 as viewed from the waveguide pattern 102, so as to connect the input-side chip connecting pattern 131 and the output-side chip connecting pattern 132 through a straight line. Solid planar patterns are formed in regions between the inner edge portions 301a and the outer edge portions 301b. The solid planar dummy patterns 301 have the solid regions 311 of a predetermined area on the input waveguide 111 side.

According to the eighth embodiment, the solid planar dummy patterns 301 connecting the chip connecting patterns 131, 132 on the input side and the output side are also provided along the waveguide pattern 102 in the configuration of the DC DP-QPSK optical modulator for each channel of the DP-QPSK modulators. As a result, the occurrence of electrical discharge may be prevented in the waveguide pattern 102 portion of the DP-QPSK modulator of each channel and in particular, the input waveguide 111 portion may be prevented from being damaged due to the occurrence of electrical discharge. According to the eighth embodiment, the electrical charge due to the pyroelectric effect may more strongly be diffused as compared to the sixth and seventh embodiments and the occurrence of the electrical discharge may be suppressed whereby the waveguide patterns 102 may be formed without damage on the LN wafer 101.

Figure 11:
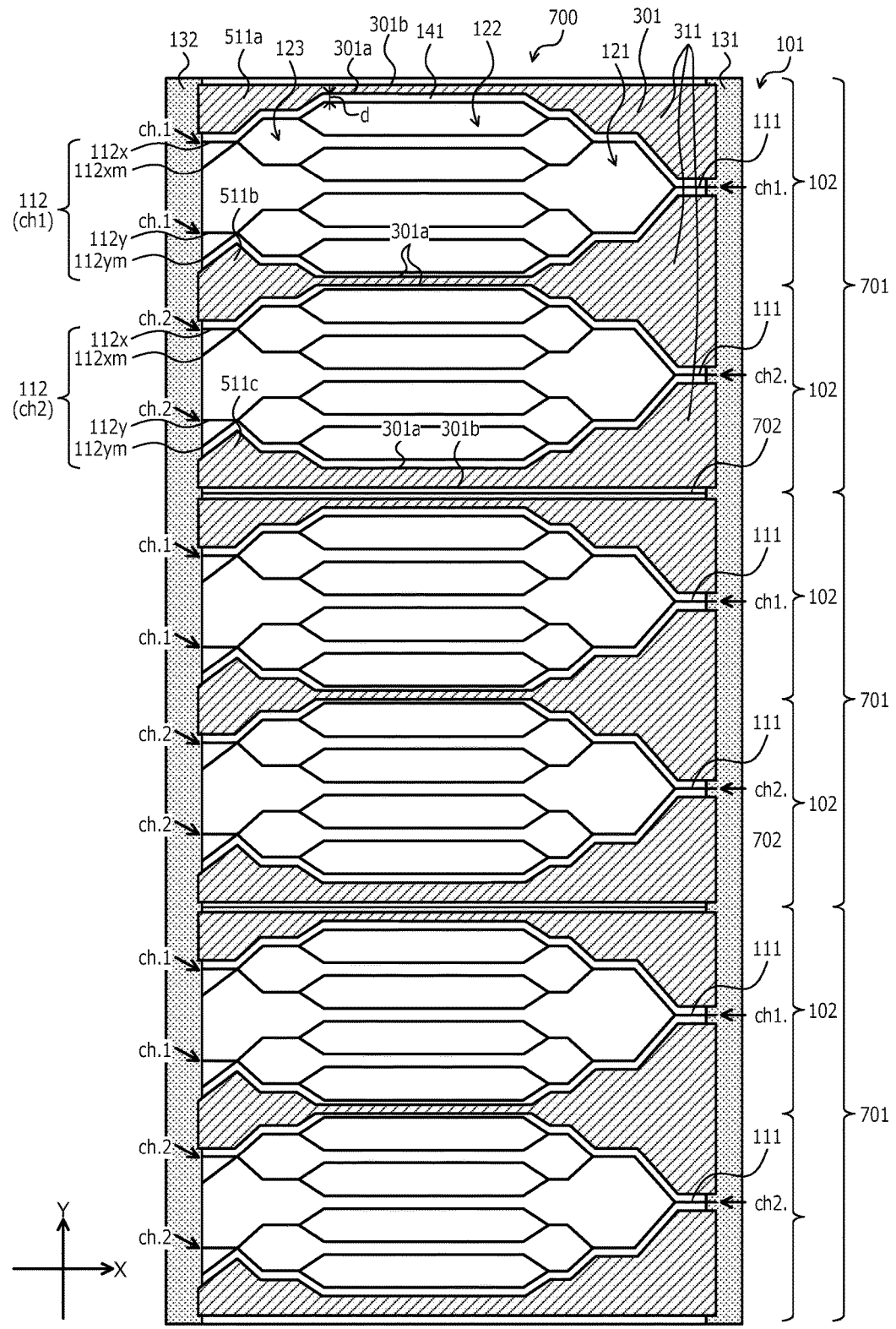
FIG. 11 is a plan view of a configuration example of a DC DP-QPSK optical modulator according to a ninth embodiment.

FIG. 11 is a plan view of a configuration example of a DC DP-QPSK optical modulator according to a ninth embodiment. Parts similar to those described in the first to eighth embodiments are denoted by the same reference numerals used in the first to eighth embodiments. The configuration of the ninth embodiment is a modification example of the eighth embodiment (FIG. 10).

For example, similar to the solid planar dummy pattern 301 described in the eighth embodiment, a large solid planar pattern (the solid regions 311) is included along the input waveguide 111 side. Furthermore, in the ninth embodiment, a solid planar pattern (the solid regions 511) is provided also on the output waveguide 112 side in a space where the waveguide pattern 102 is not formed (see the fourth embodiment (FIG. 5)).

As depicted in FIG. 11, the solid planar dummy pattern 301 has the three solid regions 311 divided in the width direction on the input waveguide 111 side. The three solid regions 511 (511a to 511c) divided in the width direction are correspondingly provided on the output waveguide 112 side. The solid regions 511 on the output waveguide 112 side are connected to the respective solid regions 311 on the input waveguide 111 side.

As described above, in the ninth embodiment, the solid regions 311, 511 are arranged in spaces where the waveguide patterns 102 of Ti are not formed on the input side and the output side of the waveguide patterns 102 of the DC DP-QPSK modulator 700. The solid planar dummy pattern 301 is connected to each of the ground patterns (solid planar patterns) 131, 132 for chip connection on the input side and the output side, and is arranged along the waveguide pattern 102 similar to the fourth embodiment.

According to the ninth embodiment, the solid planar dummy pattern 301 connecting the chip connecting patterns 131, 132 on the input side and the output side are also provided along the waveguide pattern 102 in the configuration of the DC DP-QPSK optical modulator for each channel of the DP-QPSK modulators. Additionally, the solid regions 311, 511 are provided along the waveguide patterns 102 on the input side and output side as the dummy pattern 301. As a result, the occurrence of electrical discharge may be prevented in the waveguide pattern 102 portion of the DP-QPSK modulator of each channel and in particular, the input waveguide 111 portion may be prevented from being damaged due to the occurrence of electrical discharge. According to the ninth embodiment, the solid planar pattern 511 is added to the configuration of the eighth embodiment and the electrical charge due to the pyroelectric effect can more strongly be diffused as compared to the eighth embodiment and the occurrence of the electrical discharge may be suppressed whereby the waveguide patterns 102 may be formed without damage on the LN wafer 101.

Figure 12:
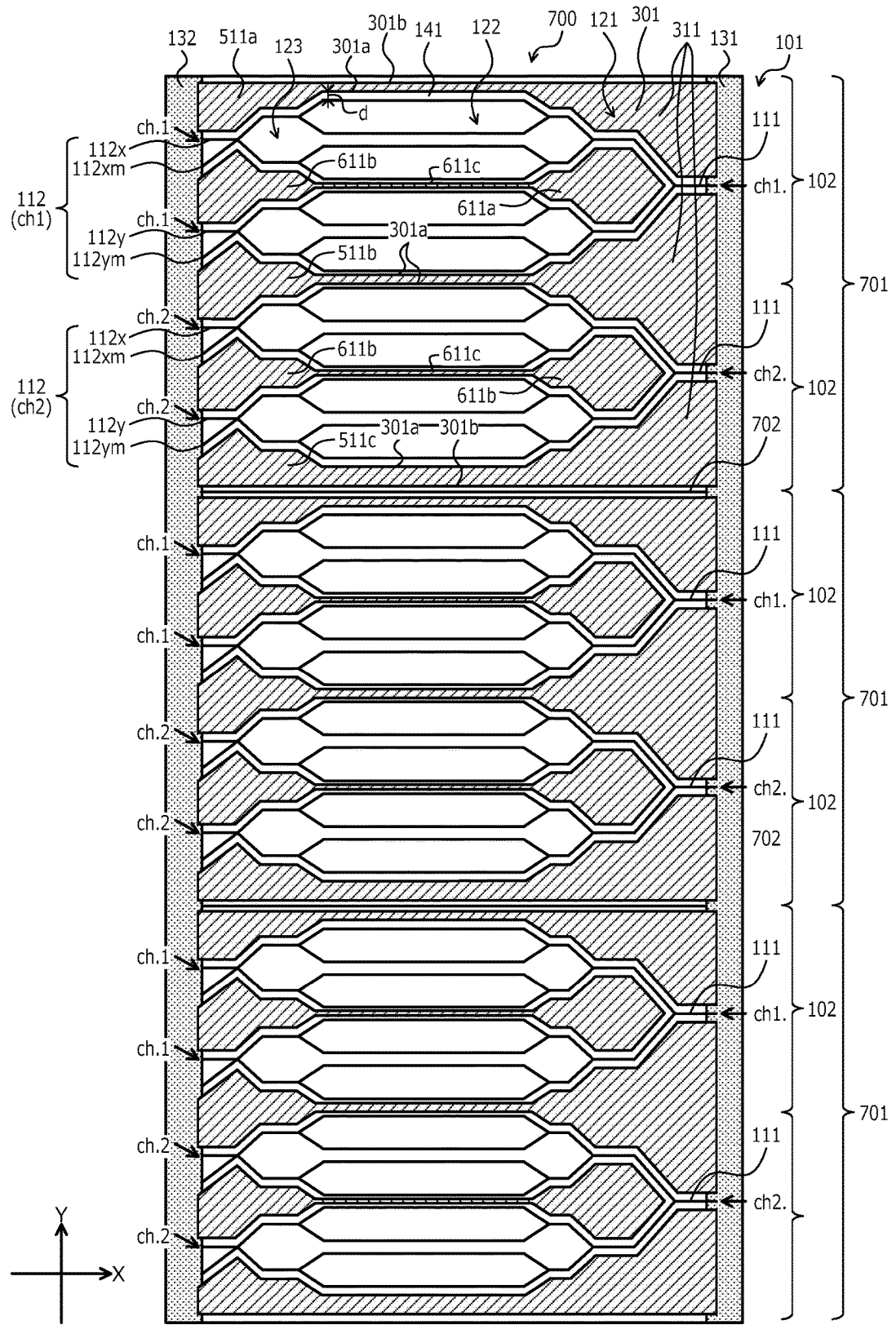
FIG. 12 is a plan view of a configuration example of a DC DP-QPSK optical modulator according to a tenth embodiment.

FIG. 12 is a plan view of a configuration example of a DC DP-QPSK optical modulator according to a tenth embodiment. Parts similar to those described in the first to ninth embodiments are denoted by the same reference numerals used in the first to ninth embodiments. The configuration of the tenth embodiment is a modification example of the ninth embodiment (FIG. 11).

For example, similar to the solid planar dummy pattern 301 described in the eighth embodiment, a large solid planar pattern (the solid regions 311) is included along the input waveguide 111 side. Additionally, a solid planar pattern (the solid regions 511) is provided also on the output waveguide 112 side in a space where the waveguide pattern 102 is not formed as described in the ninth embodiment (see the fourth embodiment (FIG. 5)). Furthermore, the solid region 611 is provided between the waveguide patterns 102 of the X and Y polarizations as described in the fifth embodiment (see FIG. 6).

For the solid region 611, as described with reference to FIG. 6, the solid region 611a is provided in the space of the central portion of the branching unit 121 at the distanced from the waveguide pattern 102. Similarly, the solid region 611b is provided in the space of the central portion of the coupler 123 at the distance d from the waveguide pattern 102. The solid region 611a is connected to the solid region 611b via the connecting pattern 611c. The solid region 611b is connected to the chip connecting pattern 132 on the output waveguide 112 side and the solid region 611a of the brancher 121 is connected to the ground chip connecting pattern 132.

In the tenth embodiment, the solid planar patterns 611 (611a, 611b) are respectively provided in the spaces without the waveguide pattern 102 of Ti on the input side and the output side as well as the inside of the brancher 121 of the X and Y polarizations and the inside of the coupler 123 in the DC DP-QPSK waveguide pattern. The solid planar patterns 611a, 611b on the input side and the output side are respectively connected to the ground patterns for chip connection (the chip connection patterns 131, 132) on the input side and the output side. The solid planar patterns 611a, 611b inside the brancher 121 and the coupler 123 of the X and Y polarizations are connected to each other by the connection pattern 611c extending along the waveguide pattern and connected to the ground pattern for chip connection (the chip connection pattern 132) on the output side.

According to the tenth embodiment, the solid planar dummy pattern 301 connecting the chip connecting patterns 131, 132 on the input side and the output side are also provided along the waveguide pattern 102 in the configuration of the DC DP-QPSK optical modulator for each channel of the DP-QPSK modulators. Additionally, the solid regions 311, 511 are provided along the waveguide patterns 102 on the input side and output side as the dummy pattern 301. Furthermore, the solid planar patterns 611a, 611b are provided inside the brancher 121 on the input side and inside the coupler 123 on the output side, and connected to the chip connecting pattern 132 on the output side.

As a result, the occurrence of electrical discharge may be prevented in the waveguide pattern 102 portion of the DP-QPSK modulator of each channel and in particular, the input waveguide 111 portion may be prevented from being damaged due to the occurrence of electrical discharge. According to the tenth embodiment, the solid planar pattern 611 is added to the configuration of the ninth embodiment, and the electrical charge due to the pyroelectric effect may be more strongly diffused as compared to the ninth embodiment and the occurrence of the electrical discharge may be suppressed whereby the waveguide patterns 102 may be formed without damage on the LN wafer 101.

Figure 13:
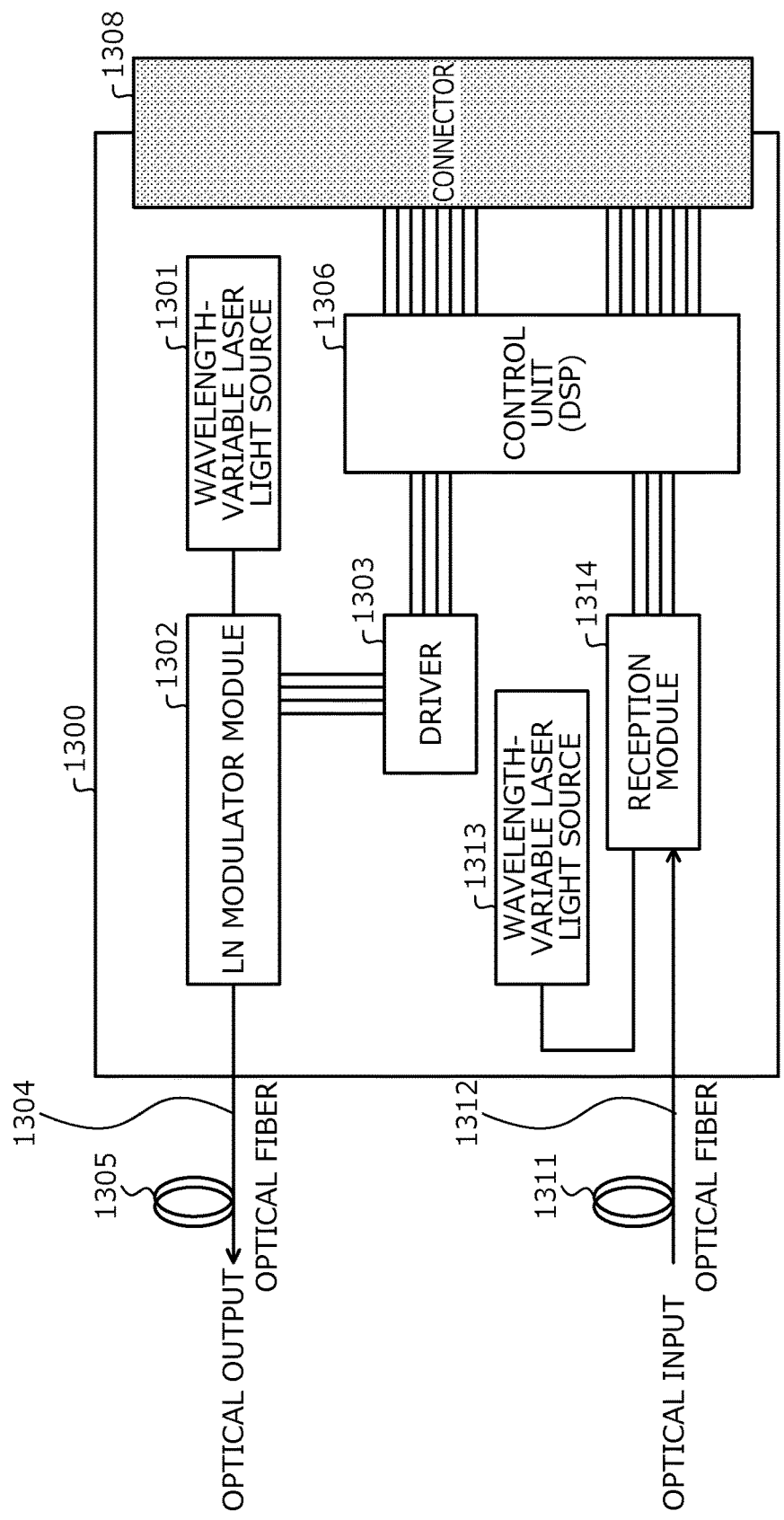
FIG. 13 is a block diagram of a configuration example of an optical module according to an embodiment.

FIG. 13 is a block diagram of a configuration example of an optical module according to an embodiment. FIG. 13 depicts a configuration example of an optical module to which the optical modulators of the embodiments described above are applied. An optical module 1300 of FIG. 13 has configurations on a transmission side and a reception side.

The transmitting side includes a wavelength-variable laser light source 1301, an LN modulator module 1302, a driver 1303, an output port 1304, an optical fiber 1305, a control unit 1306, and a connector 1308.

Data for transmission is input via the connector 1308, and the control unit 1306 made up of a digital signal processor (DSP), etc. executes a transmission process for the data, which is supplied to the LN modulator module 1302 via the driver 1303. The wavelength-variable laser light source 1301 outputs the light to the LN modulator module 1302, and the driver 1303 drives the LN modulator module 1302 and outputs an optical signal acquired by optically modulating the data, to the optical fiber 1305 via the output port 1304.

The light output from the wavelength-variable laser light source 1301 is input to the input waveguide 111 of the waveguide pattern 102 of the optical modulators 100, 700 described above. An electrical signal output by the driver 1303 is supplied to a signal electrode provided along the waveguide pattern 102 of the optical modulators 100, 700 described above and a ground electrode. The modulated optical signals of the X and Y polarizations output from the output waveguide 112 are multiplexed by a multiplexer not depicted and then output to the output port 1304.

The reception side includes an optical fiber 1311, an input port 1312, a wavelength-variable laser light source 1313, a reception module 1314, a control unit 1306, and a connector 1308.

An optical signal for reception is input through the optical fiber 1311, and the reception module 1314 demodulates the optical signal by using the light source of the wavelength-variable laser light source 1313 and outputs the signal to the control unit 1306. The control unit 1306 decodes and outputs data via the connector 1308.

The control unit 1306 of the configuration is not limited to the DSP and may be configured by using a central processing unit (CPU). In this case, the CPU may implement the function of the control unit 1306 by executing a program stored in a memory and using a portion of the memory as a work area.

The LN modulator module 1302 depicted in FIG. 13 includes the configuration of the optical modulators 100, 700 described in the embodiments. As described in the embodiments, the LN modulator module 1302 may suppress the electrical discharge at the time of thermal diffusion for forming the waveguide pattern 102 and prevent damage of the input waveguide 111, etc. Since the chip yield of the optical modulators 100, 700 may be improved, the manufacturing cost may be kept low and the reliability may be improved.

Figure 14:
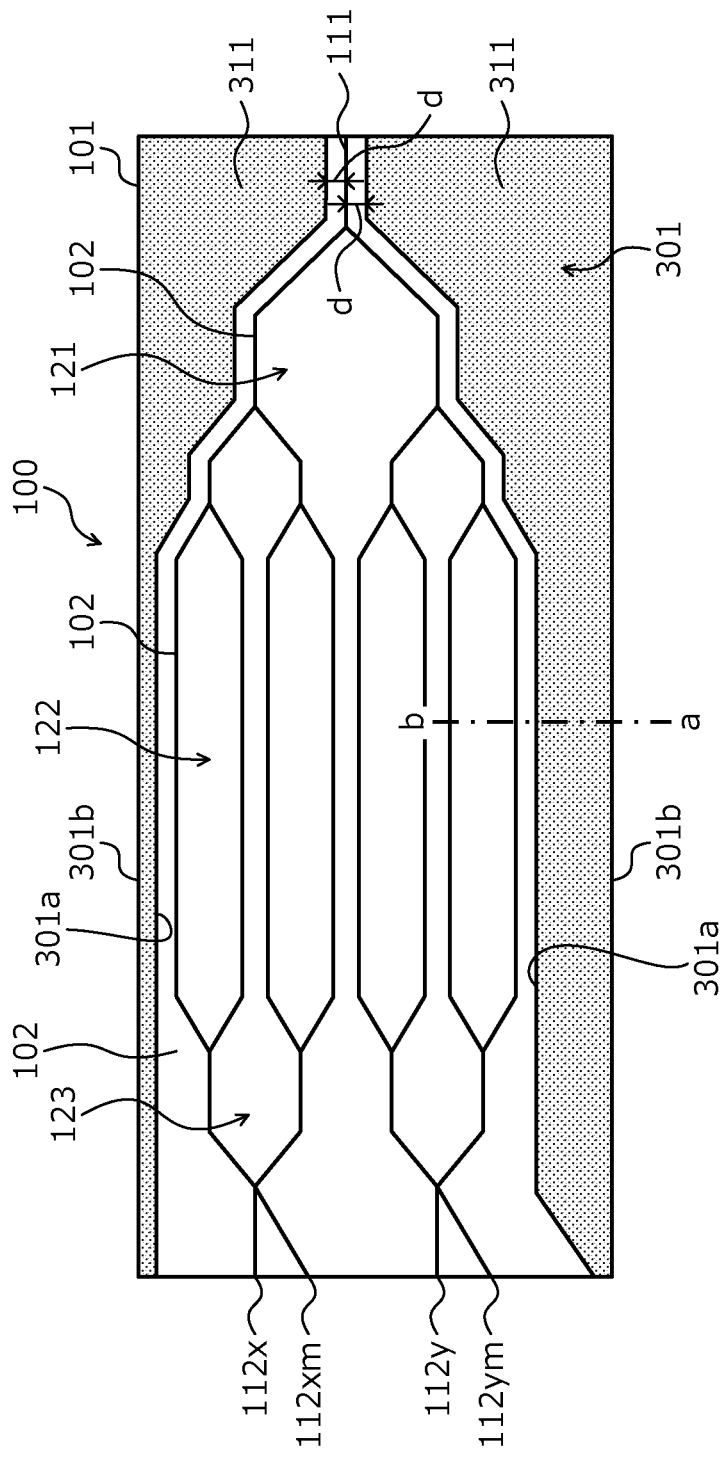
FIG. 14 is the optical modulator 100 of the DP-QPSK system on a single chip.
Figure 15A:
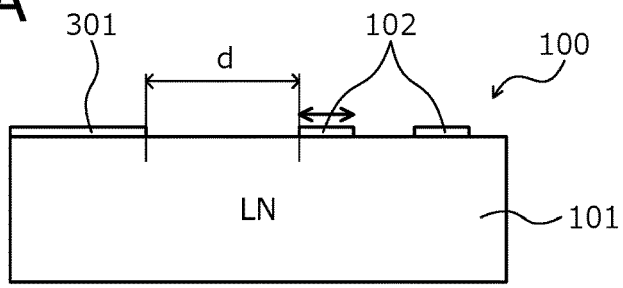
FIGS. 15A, 15B, 15C, 15D, and 15E are cross-sectional views of the optical module of the embodiments during manufacturing.
Figure 15B:
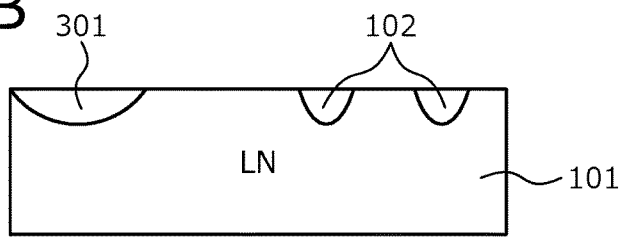
Figure 15C:
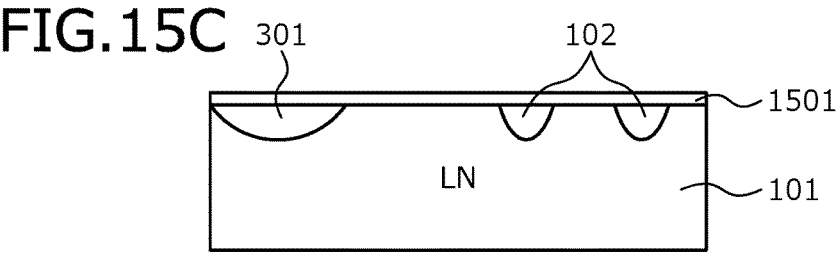
Figure 15D:
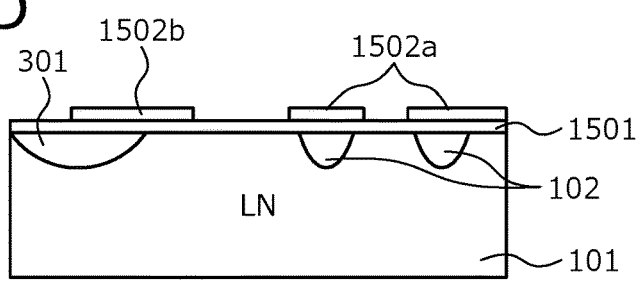
Figure 15E:
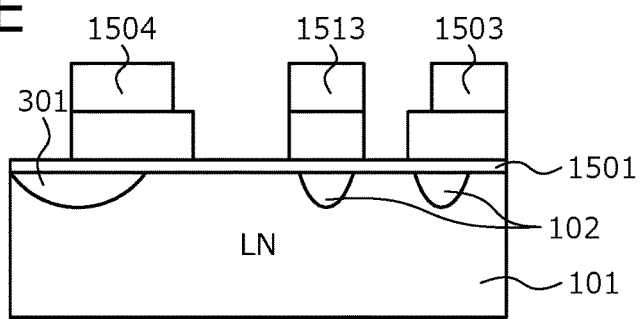
Figure 16:
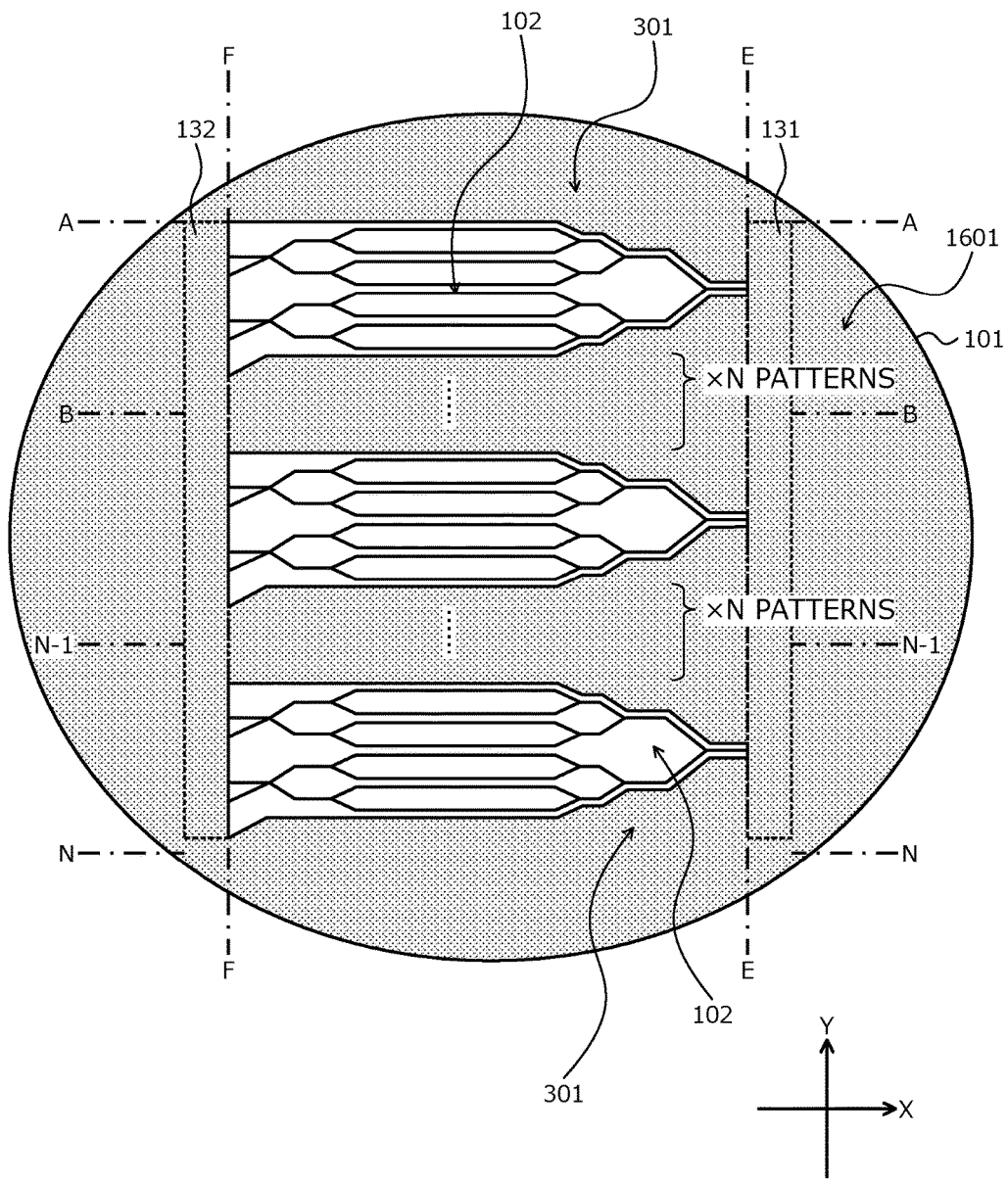
FIG. 16 is a plan view of an LN wafer during manufacture.

FIGS. 14, 15A, 15B, 15C, 15D, 15E, and 16 are diagrams of the optical modulator of the embodiment during manufacturing. FIG. 14 is the optical modulator 100 of the DP-QPSK system on a single chip. A dummy pattern depicted in FIG. 14 is the solid planar dummy pattern 301 described in the third embodiment (see FIG. 3). FIGS. 15A, 15B, 15C, 15D, and 15E are cross-sectional views during manufacturing, taken along a line a-b of FIG. 14. FIG. 16 is a plan view of the entire LN wafer 101 immediately before heating.

The manufacturing steps of the optical modulator 100 will be described in order with reference to FIGS. 15A to 15E. First, as depicted in FIG. 15A, metal such as Ti is vapor-deposited on the substrate (LN wafer) 101 to pattern the shape of the waveguide pattern 102 depicted in FIG. 14. In this patterning, the waveguide pattern 102 is transferred onto the LN wafer 101 by a technique such as photolithography using a photomask, etc. and unnecessary Ti other than the waveguide pattern 102 is then removed by wet etching, etc.

In this case, the dummy pattern 301 is patterned at the same time along with the waveguide pattern 102. Furthermore, although not depicted in FIGS. 15A to 15E, a dicing pattern for dividing into chips (e.g., 702 of FIG. 7) is patterned at the same time. As described above, the dummy pattern 301 is formed at the distance d from the closest waveguide pattern 102.

As depicted in FIG. 15B, the LN wafer 101 is then placed in a diffusion furnace and heated at a high temperature for several hours. For example, the wafer is heated at 1000 degrees C. for eight hours. As a result, the metal of Ti is diffused inside the LN wafer 101 to form an optical waveguide (the waveguide pattern 102). The dummy pattern 301 of the metal of Ti is also diffused at the same time inside the LN wafer 101.

As depicted in FIG. 15C, a buffer layer 1501 is then formed on the LN wafer 101 (the waveguide pattern 102). As depicted in FIG. 15D, a metal (e.g., Ti/gold (Au)) film 1502a serving as a foundation of a signal electrode is patterned into a predetermined electrode shape along the waveguide pattern 102. In this case, a metal film 1502b serving as a foundation of a ground electrode is also formed on the dummy pattern 301 portion.

As depicted in FIG. 15E, a signal electrode 1503 is formed by stacking multiple layers by plating on the metal film 1502a portion serving as the foundation of the signal electrode. At the same time, a signal electrode 1504 is formed by stacking multiple layers by plating on the metal film 1502b portion serving as the foundation of the ground electrode.

As depicted in FIG. 16, multiple chips (each corresponding to the one waveguide pattern 102 of FIG. 14) are formed by patterning on the LN wafer 101, forming one row in the length direction X and multiple rows in the width direction Y.

In the example depicted in FIG. 16, the metal of Ti serving as a dummy pattern 1601 is solidly formed on the entire surface surrounding the multiple waveguide patterns 102 on the LN wafer 101. The dummy pattern 1601 is configured to include the dummy patterns (the linear dummy pattern 141, the mesh dummy pattern 201, and the solid planar dummy pattern 301) and the chip connecting patterns 131, 132 described in the embodiments. In FIG. 16, dotted lines indicate positions corresponding to the chip connecting patterns 131, 132.

After the heat treatment of the LN wafer 101 depicted in FIG. 16, the wafer is diced at dicing positions A to N along the length direction X and diced at dicing positions E, F along the width direction Y, so that multiple chips (each corresponding to the one waveguide pattern 102 of FIG. 14) may be cut out.

In the embodiments described above, the configuration examples using an LN wafer for the substrate of the modulator have been described, and the configuration examples using Ti for the waveguide pattern have been described; however, in another configuration example, another metal material other than Ti, for example, magnesium (Mg) may be used for doping to LN. The embodiments are configured to form an optical waveguide on a substrate through thermal diffusion of metal, and the metal is not limited to Ti and may be another metal applicable for thermal diffusion.

According to the embodiments described above, the dummy pattern is formed around the waveguide pattern, and the dummy pattern is connected to the chip connecting patterns on both the input side and the output side of the waveguide pattern. As a result, the electrical discharge in the waveguide pattern may be suppressed at the time of heating of the substrate so as to prevent the damage of the waveguide pattern.

The dummy pattern may be formed linearly outside the waveguide pattern located in the outermost portion so as to surround the waveguide pattern, or may be formed in a mesh shape or solid shape having a predetermined area on the outside of the waveguide pattern. The dummy pattern is provided at a predetermined distance, for example, 50 μm or more, from the waveguide pattern and therefore, does not affect the optical signal passing through the waveguide pattern. The dummy pattern may be provided in a shape extending from the input side to the output side of the waveguide pattern along the waveguide pattern at the predetermined distance. Furthermore, the dummy pattern may also be formed inside the brancher and the coupler of the waveguide pattern. The dummy pattern may be connected to the chip connecting pattern on the output side. With these configurations, the area of the dummy pattern on the substrate may be increased to further prevent the occurrence of electrical discharge in the waveguide pattern.

According to the embodiment, as compared to conventional patterns of thin lines, etc. disposed only near a waveguide on the input/output side, the dummy pattern is configured to surround the waveguide pattern so as to link the chip connecting patterns on the input side and the output side. As a result, since the density of the input waveguide may be made higher and the dummy pattern may release the electrical charge also to the output side, a charge diffusing effect larger than the conventional patterns may be acquired. Therefore, even in a larger LN chip, for example, a DC DP-QPSK modulator chip, the discharge of the electrical charge may be suppressed to prevent the waveguide damage.

Since the electrical discharge in the waveguide pattern may be suppressed at the time of heating of the substrate, the manufacturing yield may be improved without damaging the waveguide pattern. Therefore, an optical modulator using a substrate chip having the waveguide pattern formed thereon may be reduced in manufacturing cost and improved in reliability.

According to an embodiment, an effect is achieved in that damage of the optical waveguide may be prevented at the time of manufacturing of the optical waveguide.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulator comprising:
   a substrate having an electro-optic effect;
   a waveguide pattern provided on the substrate and configured to modulate light; and
   a dummy pattern having a predetermined potential along the waveguide pattern from an input side to an output side,
   wherein the dummy pattern is formed into a solid shape having a predetermined area, the dummy pattern includes:
      a first dummy pattern provided in a region surrounded by an inner edge portion along an outermost portion of the waveguide pattern and an outer edge portion separate from the waveguide pattern, and
      a second dummy pattern in a vacant space inside the input side and the output side of the waveguide pattern.

2. The optical modulator according to claim 1, wherein the dummy pattern is connected to each of connection patterns respectively connected to the input side and the output side of the waveguide pattern and having a predetermined potential.

3. The optical modulator according to claim 1, wherein the dummy pattern is provided at a predetermined distance from the waveguide pattern.

4. The optical modulator according to claim 1, wherein the dummy pattern is formed into a solid shape having a predetermined area in a region surrounded by an inner edge portion along an outermost portion of the waveguide pattern and an outer edge portion separate from the waveguide pattern.

5. The optical modulator according to claim 1, wherein the first dummy pattern is provided in a vacant space outside the input side of the waveguide pattern.

6. The optical modulator according to claim 1, wherein the first dummy pattern is provided in a vacant space outside the output side of the waveguide pattern.

7. The optical modulator according to claim 6, wherein the dummy pattern is further provided to have a predetermined area in a vacant space at each of the output side and the output side of the waveguide pattern, the dummy pattern is connected to a second dummy pattern and has a predetermined potential.

8. An optical module comprising:
an optical module including:
   a substrate having an electro-optic effect;
   a waveguide pattern provided on the substrate and configured to modulate light; and
   a dummy pattern having a predetermined potential along the waveguide pattern from an input side to an output side, the optical modulator having an electrode for signal modulation and an optical waveguide formed by thermally diffusing the waveguide pattern on the substrate;
a light source configured to output light to the optical waveguide of the optical modulator; and
a processor configured to cause the electrode of the optical modulator to output data that is to be transmitted and configured to control output of an optical signal modulated by the optical modulator,
   wherein the dummy pattern is formed into a solid shape having a predetermined area, the dummy pattern includes:
      a first dummy pattern provided in a region surrounded by an inner edge portion along an outermost portion of the waveguide pattern and an outer edge portion separate from the waveguide pattern, and
      a second dummy pattern in a vacant space inside the input side and the output side of the waveguide pattern.

9. The optical module according to claim 8, further comprising
a reception module demodulating an optical signal received from an external source.

10. A method of manufacturing an optical modulator comprising:
forming a waveguide pattern to modulate light and a dummy pattern having a predetermined potential along the waveguide pattern from an input side to an output side by patterning a metal on a substrate having an electro-optic effect; and
forming an optical waveguide from the waveguide pattern by heating the substrate to thermally diffuse the metal,
   wherein the dummy pattern is formed into a solid shape having a predetermined area, the dummy pattern includes:
      a first dummy pattern provided in a region surrounded by an inner edge portion along an outermost portion of the waveguide pattern and an outer edge portion separate from the waveguide pattern, and
      a second dummy pattern in a vacant space inside the input side and the output side of the waveguide pattern.

* * * * *